United States Patent [19]
Kubesh et al.

[11] Patent Number: 5,735,245
[45] Date of Patent: Apr. 7, 1998

[54] METHOD AND APPARATUS FOR CONTROLLING FUEL/AIR MIXTURE IN A LEAN BURN ENGINE

[75] Inventors: John Thomas Kubesh; Lee Gene Dodge; Daniel James Podnar, all of San Antonio, Tex.

[73] Assignee: Southwest Research Institute, San Antonio, Tex.

[21] Appl. No.: 735,105

[22] Filed: Oct. 22, 1996

[51] Int. Cl.$^6$ ............................. F02D 41/04; F02P 5/15
[52] U.S. Cl. ............................................. 123/417; 123/676
[58] Field of Search ............................. 123/417, 494, 123/678

[56] References Cited

U.S. PATENT DOCUMENTS

| | | |
|---|---|---|
| 1,916,938 | 7/1933 | Small . |
| 2,698,613 | 11/1955 | Jagersberger ............................. 123/119 |
| 4,083,341 | 4/1978 | Brettschneider et al. ................ 123/123 |
| 4,084,563 | 4/1978 | Hattori et al. ........................... 123/119 |
| 4,129,105 | 12/1978 | Ito et al. .................................. 123/119 |
| 4,156,415 | 5/1979 | Zeller et al. ............................. 123/124 |
| 4,182,295 | 1/1980 | Zeller et al. ............................. 123/119 |
| 4,271,667 | 6/1981 | Mitsuda et al. .......................... 60/276 |
| 4,660,519 | 4/1987 | Stocker et al. ........................... 123/339 |
| 4,751,907 | 6/1988 | Yamamoto et al. ..................... 123/489 |
| 4,886,034 | 12/1989 | Lambert ................................. 123/587 |
| 4,945,870 | 8/1990 | Richeson ............................... 123/90.11 |
| 5,123,397 | 6/1992 | Richeson ............................... 123/568 |
| 5,284,116 | 2/1994 | Richeson et al. ...................... 123/425 |
| 5,297,515 | 3/1994 | Gale et al. .................................. 123/3 |
| 5,339,634 | 8/1994 | Gale et al. .............................. 60/723 |
| 5,353,776 | 10/1994 | Burrahm et al. ....................... 123/700 |
| 5,499,605 | 3/1996 | Thring ....................................... 123/70 |
| 5,524,599 | 6/1996 | Kong et al. ............................. 123/682 |
| 5,586,524 | 12/1996 | Nonaka et al. ......................... 123/73 A |

FOREIGN PATENT DOCUMENTS

| | | | |
|---|---|---|---|
| 208555 | 8/1989 | Japan ............................. F02M 21/02 |
| 211635 | 8/1989 | Japan ............................. F02D 41/14 |

*Primary Examiner*—Willis R. Wolfe
*Assistant Examiner*—Hieu T. Vo
*Attorney, Agent, or Firm*—Baker & Botts, L.L.P.

[57] ABSTRACT

The system for controlling the fuel/air mixture supplied to a lean burn engine when operating on natural gas, gasoline, hydrogen, alcohol, propane, butane, diesel or any other fuel as desired. As specific humidity of air supplied to the lean burn engine increases, the oxygen concentration of exhaust gas discharged by the engine for a given equivalence ratio will decrease. Closed loop fuel control systems typically attempt to maintain a constant exhaust gas oxygen concentration. Therefore, the decrease in the exhaust gas oxygen concentration resulting from increased specific humidity will often be improperly attributed to an excessive supply of fuel and the control system will incorrectly reduce the amount of fuel supplied to the engine. Also, the minimum fuel/air equivalence ratio for a lean burn engine to avoid misfiring will increase as specific humidity increases. A relative humidity sensor to allow the control system to provide a more enriched fuel/air mixture at high specific humidity levels. The level of specific humidity may be used to compensate an output signal from a universal exhaust gas oxygen sensor for changing oxygen concentrations at a desired equivalence ratio due to variation in specific humidity specific humidity. As a result, the control system will maintain the desired efficiency, low exhaust emissions and power level for the associated lean burn engine regardless of the specific humidity level of intake air supplied to the lean burn engine.

22 Claims, 4 Drawing Sheets

METHOD AND APPARATUS FOR CONTROLLING FUEL/AIR MIXTURE IN A LEAN BURN ENGINE

CONTRACT

The U.S. Government has a paid-up license in this invention and the right in limited circumstances to require the patent owner to license others on reasonable terms as provided for by the terms of Contract No. ZCR-5-13519-01 awarded by the National Renewable Energy Laboratory.

TECHNICAL FIELD OF THE INVENTION

This invention relates generally to apparatus and methods for controlling the fuel/air mixture supplied to a combustion engine. More particularly, but not by way of limitation, this invention relates to using specific humidity of intake air and exhaust gas oxygen concentration to control the fuel/air mixture for optimum performance of a lean burn engine.

BACKGROUND OF THE INVENTION

Lean fuel/air mixtures have been used for many years to operate combustion engines. For example, U.S. Pat. No. 1,916,938 issued Jul. 4, 1933 describes the use of a by-pass air conduit in a carbureted engine to reduce the amount of fuel in the fuel/air mixture to increase the efficiency of the engine. U.S. Pat. Nos. 4,084,563; 4,182,295; and 4,751,907 illustrate other systems that have been designed to provide additional air to an engine along with air normally provided through the associated carburation system. The additional air results in a leaner fuel mixture which not only makes the engine operate more efficiently, but also reduces some of the pollutants produced when the engine is operating.

Previous fuel/air control systems have been used sensors located in the intake and the exhaust systems to monitor fuel supply and oxygen in the exhaust from the engine. These sensors have been used to control a by-pass throttle valve and in some instances the main throttle valve in an effort to control the fuel/air mixture over various operating conditions of the associated lean burn engine. Previous engine control systems such as shown in U.S. Pat. No. 5,284,116 entitled "Vehicle Management Computer" have used ambient air relative humidity for controlling the associated vehicle in accordance with optimum engine operating parameters.

U.S. Pat. No. 5,297,515 entitled "Fuel Supply Systems for Engines and Combustion Processes Therefor" and U.S. Pat. No. 5,339,634 entitled "Fuel Supply System for Engines and Combustion Processes Therefor" disclose apparatus and methods to form a hydrocarbon lean mixture to operate an engine. U.S. Pat. No. 5,353,776 entitled "Method and Apparatus for Controlling Fuel Flow to Lean Burn Engines" discloses an air by-pass conduit and control system to provide an engine with the desired lean fuel/air mixture.

Each of the above-referenced patents is incorporated by reference for all purposes within this application.

SUMMARY OF THE INVENTION

In accordance with teachings of the present invention, a fuel control system for a lean burn engine is provided to substantially reduce or eliminate the disadvantages and problems associated with changes in specific humidity of ambient air supplied to such engines.

One aspect of the present invention includes providing a closed loop fuel control system for a lean burn engine having a universal exhaust gas oxygen sensor (UEGO) and an intake air humidity sensor wherein the control system will select the appropriate fuel/air equivalence ratio to avoid engine misfires while the specific humidity of the intake air supplied to the engine varies. When the specific humidity of the intake air increases, the control system will enrich the fuel/air ratio to avoid misfires. When the specific humidity of the intake air decreases, the control system will reduce the fuel/air ratio to maintain the optimum lean burn characteristics and desired power output for the associated engine.

Technical advantages of the present invention include providing an engine control system with enriched lean fuel/air operating limits at high levels of specific humidity. The present invention also adjusts the output of a universal exhaust gas oxygen sensor to compensate for changes in specific humidity of intake air supplied to the associated engine.

An engine control system incorporating teachings of the present invention may adjust the spark timing to compensate for changes in combustion rate caused by changes in specific humidity of intake air supplied to the associated spark ignited combustion engine. Also, an engine control system for a turbocharged combustion engine may adjust boost pressure to compensate for changes in the oxygen concentration of intake air caused by changes in specific humidity.

An engine control system incorporating teachings of the present invention allows a lean burn engine to maintain a desired power output, high fuel efficiency, and low levels of exhaust gas emissions regardless of changes in the specific humidity of intake air supplied to the engine.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF THE INVENTION

The preferred embodiments of the present invention and its advantages are best understood by referring to FIGS. 1–6 of the drawings, like numerals being used for like and corresponding parts of the various drawings.

Figure 1:
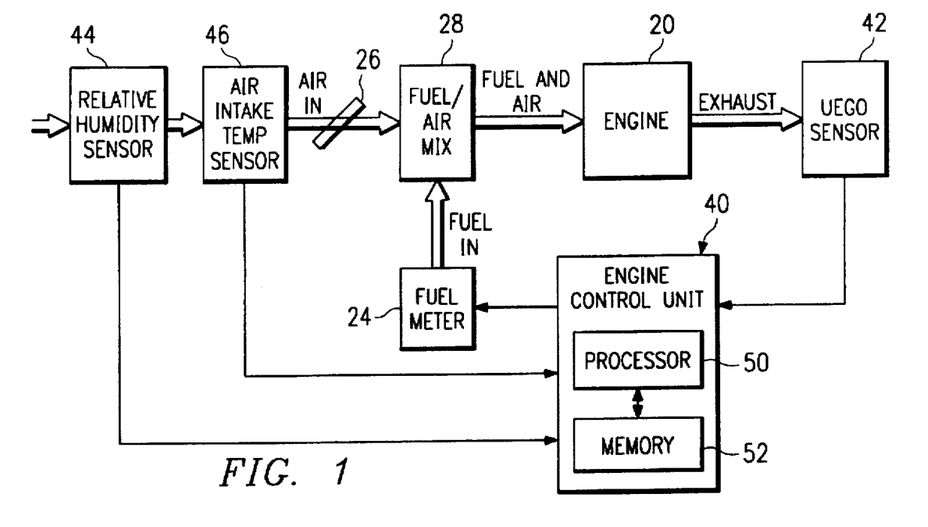
FIG. 1 is a schematic drawing showing a block diagram of various components of a lean burn engine and associated control system to adjust the fuel/air mixture supplied to the engine in response to variations in specific humidity of engine intake air.

FIG. 1 is a schematic block diagram showing various components of engine 20 and control system 40. A wide variety of internal combustion engines such as shown in U.S. Pat. Nos. 5,297,515; 5,353,776; and 5,499,605 may be satisfactorily used with the present invention. For many applications, engine 20 will preferably be an internal combustion, spark ignited engine having one or more cylinders and pistons (not expressly shown) to convert the rapid combustion of a fuel/air mixture into mechanical power output from the engine. The cylinders and their respective pistons provide variable volume combustion chambers. For one application, the present invention was used with a six cylinder, in-line, turbocharged, lean burn, spark ignited natural gas engine to develop the graphs shown in FIGS. 2, 3 and 4. For some applications, engine 20 may be a diesel engine instead of a spark ignited engine.

A supply of fuel such as natural gas, gasoline, hydrogen, diesel, propane, butane, alcohol or a mixture of these fuels (not expressly shown) is preferably provided for engine 20. Also, an intake system (not expressly shown) is preferably provided to supply the desired fuel/air mixture to engine 20. An exhaust system (not expressly shown) is preferably provided to remove exhaust gases such as air, unspent fuel and combustion products from the burning of a fuel/air mixture within one or more of the combustion chambers associated with engine 20.

For purposes of this patent application, the term "fuel/air equivalence ratio" shall mean the actual fuel to air ratio, or the mass flow rate of fuel divided by the mass flow rate of air which is then divided by the stoichiometric fuel to air ratio or what is sometimes referred to as the chemically correct ratio for combustion to consume all of the fuel and oxygen present in the combustion chamber with no excess fuel or oxygen in the exhaust.

Fuel/air equivalence ratio=$(f/a)/(f_s/a_s)$ f=fuel mass flow rate actual
a=air mass flow rate actual
$f_s$=fuel mass flow rate for stoichiometric combustion
$a_s$=air mass flow rate for stoichiometric combustion For purposes of the present application, the terms "lean limit" or "lean misfire limit" are used to define when the actual fuel/air mixture supplied to a lean burn engine such as engine 20 is too lean to ignite or totally propagate throughout the associated combustion chamber. When lean burn engine 20 is operated below the associated lean limit or lean misfire limit, the resulting failure to have complete combustion will dramatically increase unburned hydrocarbon (unspent fuel) emissions. In addition, operating lean burn engine 20 below its associated lean limit will substantially reduce the efficiency of engine 20, since not all of the fuel supplied to engine 20 is consumed.

For purposes of the present application, the term "lean limit equivalence ratio" shall mean the fuel/air equivalence ratio at which a lean burn engine such as engine 20 experiences its lean limit. The lean limit equivalence ratio is a measure of the location of the boundary between normal lean operation and a misfiring operation. At fuel/air equivalence ratios less the lean limit equivalence ratio, engine 20 will misfire and run poorly. At fuel/air equivalence ratios higher than the lean limit equivalence ratio, engine 20 will not misfire due to improper fuel/air ratio. However, the efficiency of engine 20 will be reduced and undesirable exhaust gas emission may increase. Misfires of engine 20 may be caused by conditions other than operating below the lean limit equivalence ratio.

Lean burn engines such as engine 20 typically operate close to the associated lean misfire limit for the desired power output level to maintain optimum engine efficiency with low exhaust gas emissions such as nitrogen oxides. Under many operating conditions, the lean misfire limit will typically increase with increased specific humidity of ambient air supply to the intake of engine 20. As specific humidity of the intake air increases, the associated water vapor will further dilute the amount of fuel in the combustion chamber or cylinders (not expressly shown) associated with engine 20. Since engine 20 typically operates close to the associated lean misfire limit, any dilution in the fuel within the respective cylinders, will reduce the power output from engine 20. Also, any water vapor in the combustion chambers or cylinders will absorb energy from the combustion of the fuel. The energy absorbed by the water vapor is not available to do useful work by applying force to the associated pistons. Also, increasing the amount of water vapor present in the combustion chambers or cylinders of engine 20 will slow down the combustion rate, particularly when initially starting engine 20.

The amount of water vapor that air can hold without condensation of the water vapor is dependent upon the temperature of the air. "Relative humidity" is an indication of the amount of water vapor present in ambient air measured with respect to the maximum amount of water vapor that can be held by air at the same temperature without condensation. Therefore, a reading of fifty percent relative humidity indicates that the air is holding fifty percent of its maximum capacity of water vapor without condensing at a given temperature.

"Specific humidity" is a measurement of the actual amount of water vapor in ambient air. For example, a typical specific humidity measurement might be 0.1 pounds of water/pound of air. High specific humidity may have a very negative effect upon the performance of a lean burn engine such as engine 20. However, high relative humidity may or may not have a significant effect upon the performance of engine 20. For example, when ambient air temperature is $-5°$ C. and the relative humidity is 90%, the actual amount of water vapor or specific humidity in the ambient air is very low. In contrast, when ambient air temperature is 45° C. with 90% relative humidity, the amount of water vapor or specific humidity of the ambient air is quite high and may have a negative effect on the performance of engine 20.

Oxygen concentration in the exhaust gas is typically one of the key parameters used to control the operation of a lean burn engine close to the desired lean limit equivalence ratio. As shown in FIG. 1, engine 20 includes universal exhaust gas oxygen (UEGO) sensor 42 for measuring the concentration of oxygen in the exhaust gas discharged from engine 20. UEGO sensor 42 provides a signal to engine control system 40, which in turn adjusts the fuel/air ratio to maintain the desired level of oxygen concentration in the exhaust gas.

Closed loop fuel control systems that use UEGO sensors such as sensor 42 to control a lean burn engine such as engine 20 may also be affected by changes in specific humidity. As the specific humidity of intake air supplied to engine 20 increases, the oxygen concentration in the exhaust gas for a given fuel/air equivalence ratio will decrease. Closed loop fuel control systems typically attempt to maintain a relatively constant exhaust gas oxygen concentration. Therefore, as the concentration of oxygen in intake air supplied to engine 20 decreases in response to increased specific humidity, a typical control system will receive a signal corresponding to the decrease in exhaust gas oxygen concentration and will incorrectly attribute the decrease to an excessive amount of fuel being supplied to engine 20. A typical control system that does not incorporate teachings of the present invention will incorrectly further lean the fuel/air mixture supplied to engine 20 resulting in increased misfires and reduced power output.

Figure 2:
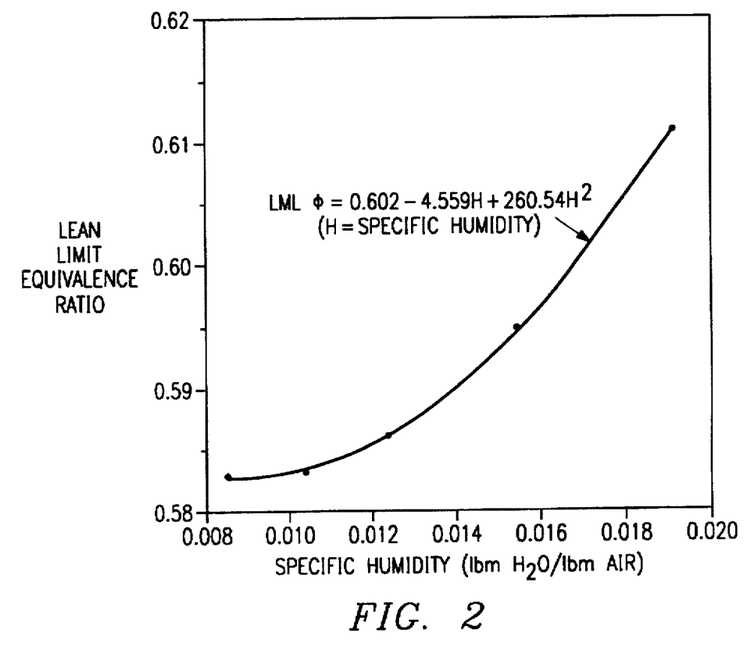
FIG. 2 is a graphical representation of the effect of changes in specific humidity of engine intake air on the lean limit equivalence ratio for a lean burn engine.

FIG. 2 shows the effects of increased specific humidity of intake air supplied to engine 20. As previously noted for this application, engine 20 was a six-cylinder, in-line, turbocharged lean burn, spark ignited, nature gas engine. For this specific example, engine 20 was operating at 1400 revolutions per minute (rpm) with twenty-five pounds per square inch absolute (psia) manifold air pressure and a spark advance of 26°. A spark advance of 0° would correspond with igniting combustion in a combustion chamber or cylinder when the associated piston was at its top dead center position with maximum compression of the fuel/air mixture disposed therein.

As the specific humidity of intake air supplied to engine 20 increases, it is generally necessary to enrich the fuel/air mixture supplied to engine 20 to avoid misfires. As a result of various tests the lean limit equivalence ratio for engine 20 for one application varied in accordance with the following function:

$$LML\ \phi = A - BH + CH^2$$

H=specific humidity (lbs mass H$_2$O/lb mass air)
LML $\phi$=lean limit equivalence ratio
A=0.602
B=4.559
C=260.54

The value of the A, B, and C will vary depending upon the characteristics of each lean burn engine and the fuel supplied to the respective lean burn engine. For typical spark ignite internal combustion engines the value of A may vary from approximately 0.550 to 0.750. The values of B and C may be determined by testing each lean burn engine and associated fuel.

Figure 3:
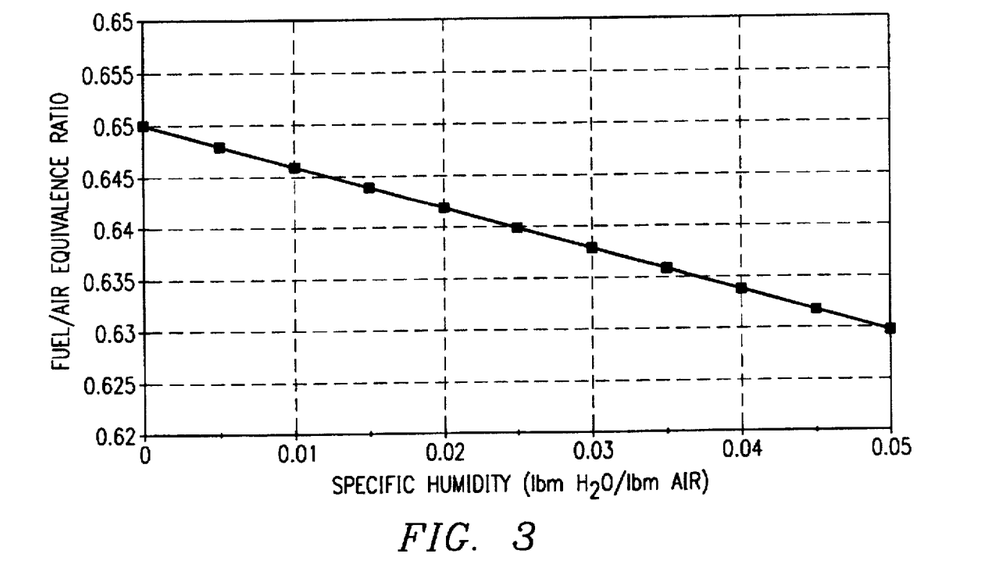
FIG. 3 is a graphical representation of the effect of changes in specific humidity of engine intake air on the output from a universal exhaust gas oxygen sensor.

FIG. 3 shows the effect of increased specific humidity of intake air supplied to engine 20 on the output signal from UEGO sensor 42 for a given fuel/air equivalence ratio. If engine control system 40 is not compensated in accordance with teachings of the present invention, control system 40 will lean out or reduce the amount of fuel in the fuel/air mixture supplied to engine 20 as the specific humidity of intake air increases. For one application, the fuel equivalence ratio for engine 20 decreased as a substantially linear function as shown in FIG. 3. As a result of increased specific humidity in the intake air, both the lean misfire limit and the power output of engine 20 will be reduced.

Figure 4:
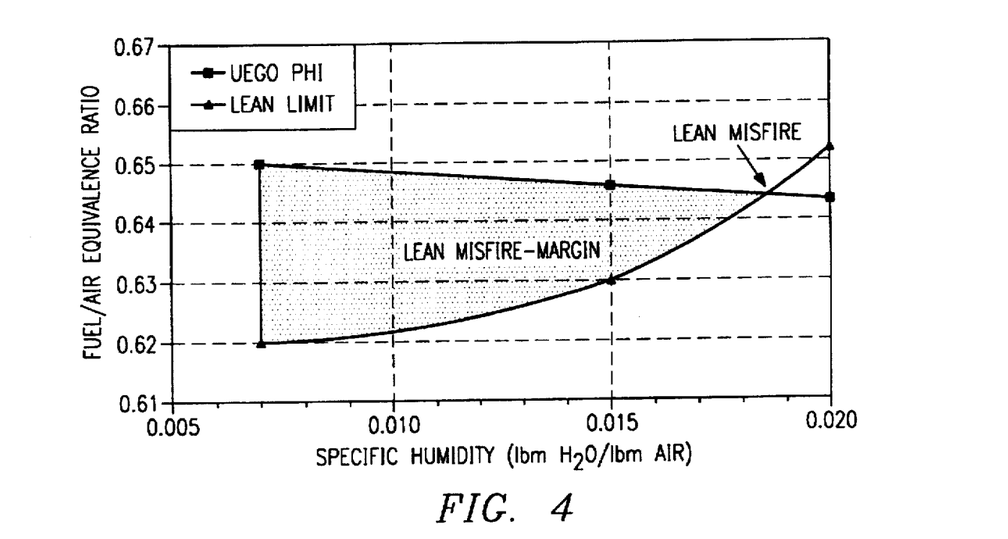
FIG. 4 is a graphical representation showing the combined effect of changes in specific humidity of engine intake air resulting in potential misfire of a lean burn engine having a universal exhaust gas oxygen sensor.

FIG. 4 is a summary of the effect of changes in the specific humidity of intake air on the lean misfire characteristic of engine 20. A typical control system, unless compensated in accordance with teachings of the present invention, will lean out the fuel/air mixture as specific humidity of intake air increases. At the same time the lean misfire limit will also increase as the specific humidity increases. When the specific humidity of engine intake air reaches a sufficiently high level, the equivalence ratio of the fuel/air mixture supplied to engine 20 will equal the equivalence ratio of the lean misfire limit, and misfires will occur.

Engine 20 may include a conventional carburetor system (not expressly shown) or fuel injection system (not expressly shown). For the embodiment shown in FIG. 1, engine control system 40 provides a signal to fuel metering device 24 and throttle valve 26 to control the amount of fuel and air supplied to intake system 28. For some applications, intake system 28 may include a conventional carburetor or an intake manifold having appropriately sized fuel injection ports. The present invention may be satisfactorily used with other types of fuel/air mixing systems and is not limited to use with either a carburetor system or a fuel injection system.

Engine control system 40 preferably determines both the volume and the ratio of the fuel/air mixture supplied to engine 20. Engine control system 40 will typically vary the amount of fuel supplied by fuel metering device 24 to engine 20 and may vary the amount of intake air supplied through throttle valve 26. Alternatively, throttle valve 26 may be manually controlled, controlled by another system or even eliminated for some applications.

The teachings of the present invention may be incorporated as part of a wide variety of engine control systems such as shown in U.S. Pat. No. 5,524,599 entitled *Fuzzy Logic Air/Fuel Controller*; and U.S. Pat. Nos. 5,284,116; 5,123,397; and 4,945,870, all entitled *Vehicle Management Computer*. Engine control system 40 preferably includes at least one processor 50 for calculating fuel/air equivalence ratios and lean limit equivalence ratios in accordance with teachings of the present invention, and at least one memory or storage unit 52 having desired engine operating parameters such as lean limit equivalence ratio corresponding to various engine operating conditions.

Engine control system 40 preferably receives an output signal from relative humidity sensor 44 and air intake temperature 46. Typically, throttle valve 26 will control the quantity of the air flowing through intake system 28 to the combustion chambers or cylinders of engine 20.

Universal exhaust gas oxygen (UEGO) sensor 42 is preferably located in an exhaust pipe (not expressly shown) for the purpose of sensing oxygen concentration in exhaust gases flowing from engine 20. UEGO sensor 42 will preferably provide a signal corresponding to the percentage of oxygen concentration in the exhaust gas to engine control system 40. UEGO sensor 42 may measure either partial pressure or the volume concentration of oxygen in the exhaust gas. An output signal from UEGO sensor 42 is typically a linear change in voltage corresponding with a change in the percentage of oxygen concentration. For example, a three volt output signal from UEGO sensor 42 may indicate zero percent (0%) oxygen in the exhaust gas, and an four and a half volt output signal may correspond to an oxygen percentage of fifteen percent (15%) in the exhaust gas flowing from engine 20. Lean burn engines such as engine 20 will typically operate with an exhaust gas oxygen concentration between seven and ten percent (7%–10%).

Relative humidity sensor 44 is provided to measure the relative humidity of ambient air supplied to the intake of engine 20. For some applications, relative humidity sensor 44 may be disposed within the intake system for engine 20. For other applications, relative humidity sensor 44 may be located adjacent to the intake system of engine 20. Air intake temperature sensor 46 may be disposed either within the intake system associated with engine 20 or immediately adjacent thereto. Humidity sensor 44 and air intake temperature sensor 46 should preferably be located in close proximity to each other. Relative humidity sensor 44 transmits an output signal to control system 40 which is representative of the relative humidity in the intake air supplied to engine 20. Temperature sensor 46 transmits an output signal to control system 40 that is representative of the temperature of the intake air supplied to engine 20.

Humidity sensor 44 and temperature sensor 46 are commercially available from various companies.

Figure 5:
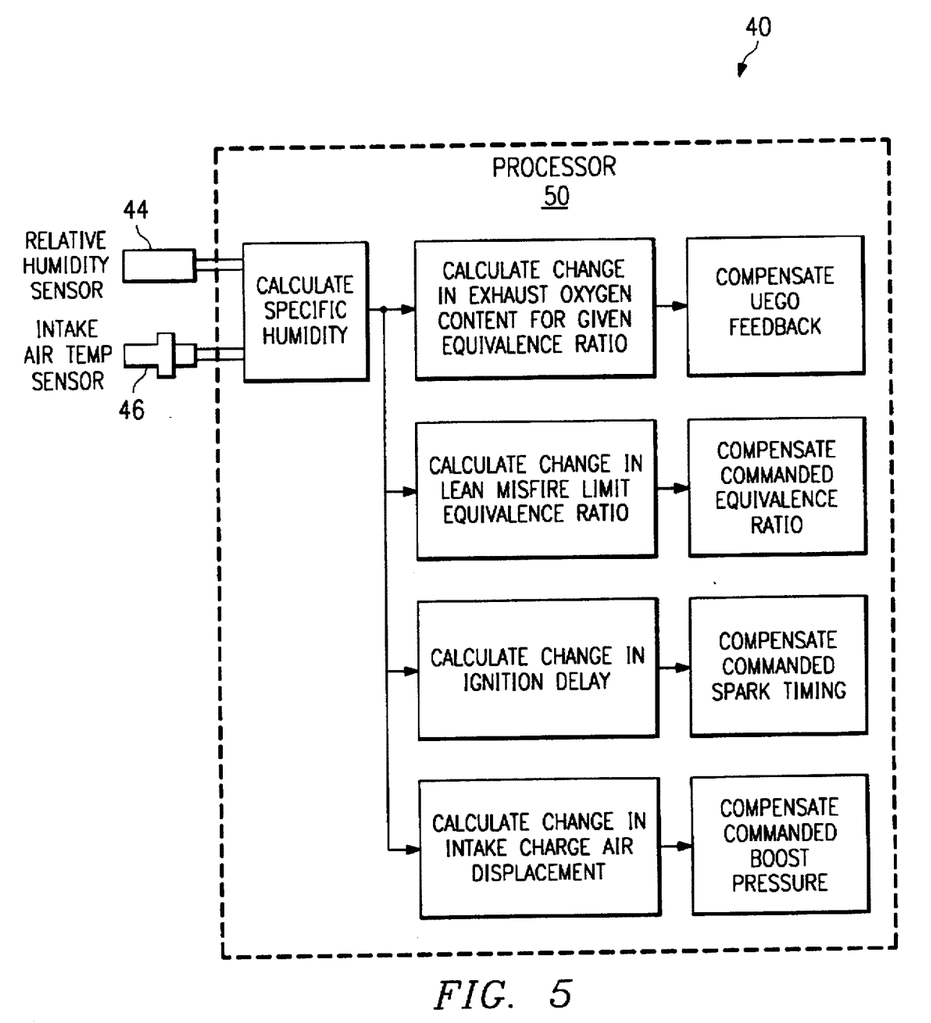
FIG. 5 is a block diagram of a control system incorporating one embodiment of the present invention for varying the ratio of the fuel/air mixture in response to changes in specific humidity of the intake air supplied to a lean burn engine.
Figure 6:
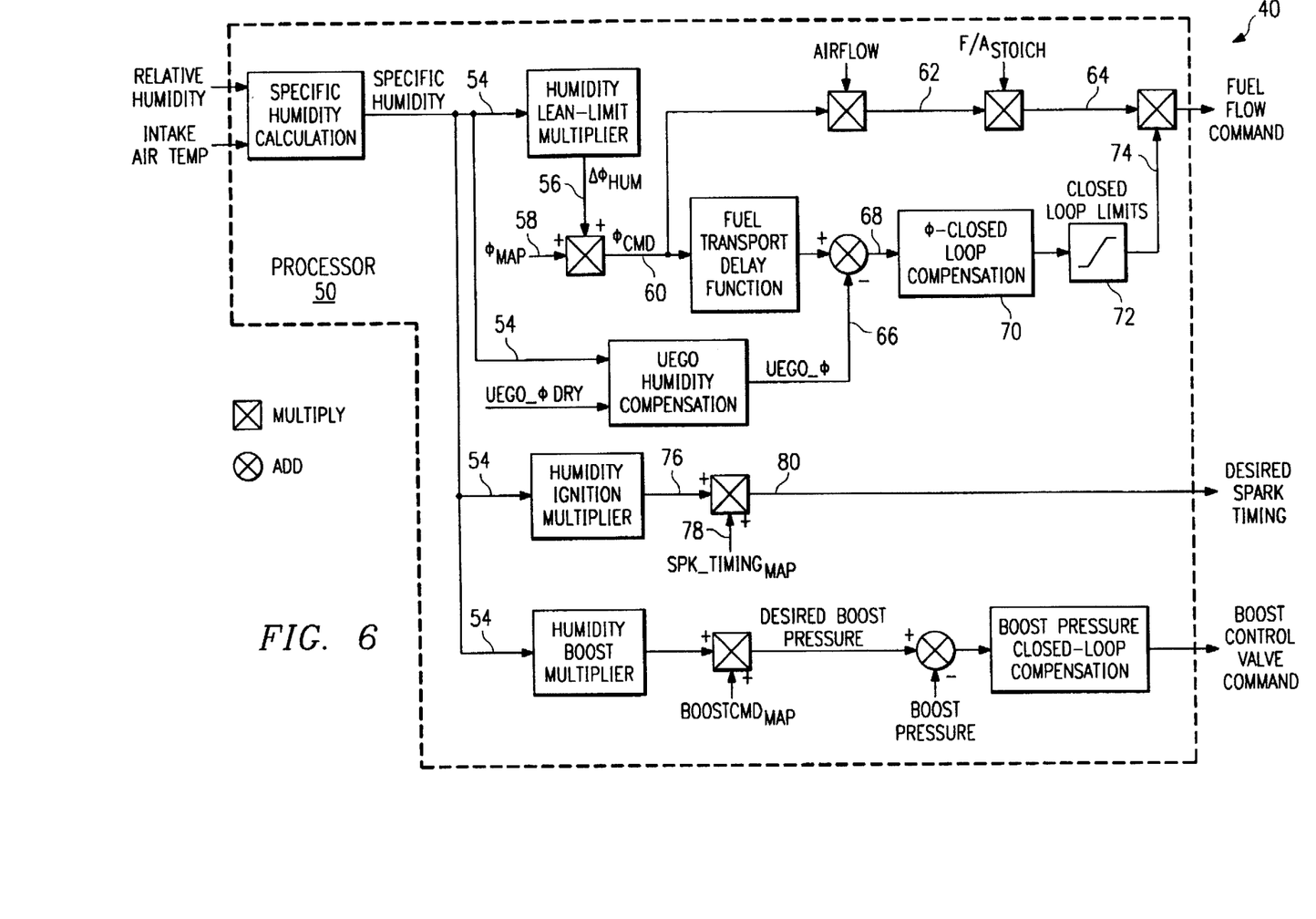
FIG. 6 is a more detailed control system logic diagram of the control system of FIG. 5 showing the use of a humidity sensor and universal exhaust gas oxygen sensor to control the fuel/air mixture supplied to a lean burn engine.

Control system 40 preferably includes at least one processor 50 which receives various signals associated with the operation and performance of engine 20. For some applications, multiple processor 50 and multiple memory or storage unit 52 may be included within engine control system 40. As shown in FIGS. 5 and 6, these signals include relative humidity and temperature of intake air supplied to engine 20. Processor 50 uses these signals to calculate the value of specific humidity of the intake air. Processor 50 can then use the value of specific humidity to allow engine control system 40 to compensate for any effect that changes in the specific humidity of intake air will have on the performance of engine 20. For example, processor 50 can calculate a change in the lean misfire limit equivalence ratio corresponding to a change in specific humidity as predicted by the graph shown in FIG. 2. Engine control system 40 may then enrich or lean the fuel/air equivalence ratio for engine 20. Processor 50 may also calculate a change in exhaust gas oxygen concentration for a given fuel/air equivalence ratio in response to a change in the value of specific humidity to properly compensate the oxygen concentration signal received from UEGO sensor 42. For spark ignited lean burn engines, processor 50 may calculate a change in ignition delay based on the value of specific humidity in the intake air. As a result of this calculation, engine control system 40 will compensate the timing for ignition of the fuel/air mixture within the associated combustion chamber or cylinders of engine 20 by either increasing or decreasing the respective spark advance for the respective cylinders.

When engine 20 includes a turbocharger (not expressly shown) to supply intake air, processor 50 can calculate a change in intake air displacement corresponding to a change in specific humidity of the intake air and provide a compensated command boost pressure signal to either increase or decrease the output of the associated turbocharger to maintain the required volume of air for the desired fuel/air equivalence ratio.

As a result of providing relative humidity sensor 42, air intake temperature sensor 46 and calculating the value of specific humidity for intake air supplied to engine 20, engine control system 40 can provide excellent control of the fuel/air equivalence ratio for engine 20 during periods of changing specific humidity of the intake air. Engine control system 40 is thus able to maintain the desired power level outputs and relatively low exhaust gas emissions regardless of changes in the specific humidity of intake air supplied to engine 20.

For many applications processor 50 and memory 52 will include various software programs to allow engine control system 40 to maintain engine 20 within desired lean burn operating characteristics. The following is an example of one such software program that may be used to calculate specific humidity of intake air from relative humidity and adjust various outputs from engine control system 40 in response to changes in the value of specific humidity.

PORTIONS OF ENGINE CONTROL SOFTWARE PROGRAM

/*** Compute saturation pressure as a function of ambient
air temperature ***
PSat = 0.0911 + value(AAT)*(-0.0038746 + value(AAT)*
(0.00014947 + value(AAT)*(-0.0000012491 +
value(AAT)*0.000000010003)));
  PSat = Saturation Pressure
  AAT = Ambient Air Temperature
/* Compute Specific Humidity */
Pw = 0.01*value(RelHum)*PSat;

PORTIONS OF ENGINE CONTROL SOFTWARE PROGRAM value(SpecHum) = 0.622*Pw/(PAmbient - Pw);
  PSat = Saturation Pressure
  RelHum = Relative Humidity
  SpecHum = Specific Humidity
  PAmbient = Ambient Pressure
  PW = Partial Pressure
/*** Compute Equivalence Ratio Multiplier as a function
of SpecHum ***/
Interpolate_1D(table_pointer(SpecHumdiv), value(SpecHum),
  table_pointer(PhiHumTbl), &value(PhiHum_BM),
  row_dimension(PhiHumTbl);
  SpecHumdiv = Specific Humidity Table
  PhiHumTbl = Equivalence Ratio-Humidity Table
  PhiHum_BM = Equivalence Ratio Humidity Multiplier
/*** Compute Spark Timing Multiplier as a function of
SpecHum ***/
Interpolate_1D(table_pointer(SpecHumdiv), value(SpecHum),
  table_pointer(SpkHumTbl), &value(SpkHum_BM),
  row_dimension(SpkHumTbl);
  SpkHumTbl = Spark-Humidity Table
  SpkHum_Bm = Spark Timing Humidity Multiplier
/*** Compute Boost Multiplier as a function of SpecHum
***/
Interpolate_1D(table_pointer(SpecHumdiv), value(SpecHum),
  table_pointer(BstHumTbl), &value(BstHum_BM),
  row_dimension(BstHumTbl);
  BstHumTbl = Boost-Humidity Table
  BstHum_Bm = Boost Pressure Humidity Multiplier
/*** Compute UEGO multiplier as a function of SpecHum
***/
Interpolate_1D(table_pointer(SpecHumdiv), value(SpecHum),
  table_pointer(UEGOHumTbl),
  &value(UEGOHum_Multiplier),
  row_dimension(UEGOHumTbl));
  UEGOHumTbl = UEGO-Humidity Table
  UEGOHum_Multiplier = UEGO Sensor Humidity Offset Memory or storage unit 52 will preferably include various tables or array of data for use by processor 50 such as a lean limit equivalence ratio versus specific humidity, ignition timing multiplier versus specific humidity, boost pressure multiplier versus specific humidity and UEGO sensor signal compensation versus specific humidity.

As shown in FIG. 6 processor 50 will calculate the value of specific humidity in the air supplied to engine 20 based on the relative humidity signal supplied by sensor 44 and the air intake temperature signal supplied by sensor 46. Processor 50 will then use the value of specific humidity to perform a series of iterative steps or processes to adjust output signals for controlling fuel metering device 24, spark ignition timing and boost control valve command if a turbocharger is included as part of engine 20.

Various steps in these iterative processes are shown in FIG. 6. The calculated value of specific humidity 54 is used as an input into an algorithm stored in memory 52 for calculating a change in desired lean limit equivalence ratio as a function of specific humidity. The algorithm for one application is shown in FIG. 2. The calculated change in the lean limit equivalence ratio (signal 56) is then compared or multiplied by the lean limits equivalent ratio (signal 58) for the manifold air pressure at which engine 20 is operating. The result is command signal 60 which is supplied to a fuel transport delay function that is also stored in memory 52. The command lean limit equivalence ratio signal 60 is also compared or multiplied by the actual air flow supplied to engine 20 and the fuel air ratio for stoichiometric combustion within engine 20. The resulting signal is further compared or multiplied by the fuel/air equivalence ratio for stoichiometric combustion to provide signal 64. The fuel transport delay function compensates for the time lapse between when a given quantity of the fuel air mixture enters the combustion chambers of engine 20 and a signal corresponding to the oxygen concentration in the resulting exhaust gas can be measured and supplied to processor 50.

Specific humidity signal is also used to calculate a humidity compensation for UEGO sensor 42 in accordance with the function as represented by FIG. 3. This signal is compared with the equivalence ratio when there is zero specific humidity in the intake air. The output of this comparison signal 60 is compared or added to the output from the fuel transport delay function. The resulting signal 68 is further multiplied at step 70 by the desired fuel flow to engine 20 and compared at step 72 with upper and lower fuel change limits. The resulting signal 74 is compared or multiplied by signal 64 to provide the fuel flow command signal from engine control system 40 to fuel metering device 24.

Specific humidity signal 54 is used to find a corresponding humidity ignition multiplier which has been previously stored in memory 52. The resulting signal 76 is compared or multiplied by signal 78 for the desired value of spark timing for the manifold air pressure at which engine 20 is operating. The resulting signal 80 is provided by engine control system 40 to adjust the spark timing of ignition within the cylinders of engine 20.

As shown in FIG. 6, processor 50 can also be used to calculate a boost control valve command signal to compensate for changes in specific humidity of intake air when a turbocharger is included as part of engine 20.

Although the present invention has been described in great detail, it should be understood that various changes, substitutions and alterations can be made hereto without departing from the spirit and scope of the invention as defined by the appended claims.

What is claimed is:

1. A humidity compensation system for a lean burn combustion engine having a desired fuel/air ratio comprising:
   a temperature sensor for measuring the temperature of the air supplied to the engine;
   a humidity sensor for determining the relative humidity of the air supplied to the engine; and
   a processor operable to:
      receive a signal associated with the temperature from the temperature sensor;
      receive a signal associated with the relative humidity from the humidity sensor;
      calculate the specific humidity of the air supplied to the engine based on the signal received from the temperature sensor and the signal received from the humidity sensor;
      calculate a compensated desired fuel/air ratio based on the specific humidity of the air supplied to the engine.

2. The humidity compensation system of claim 1 further comprising
   a memory for storing desired fuel/air ratio humidity compensation data and wherein said processor accesses said memory for its calculations.

3. The humidity compensation system of claim 1 wherein the fuel/air ratio is expressed in terms of a fuel/air equivalence ratio.

4. A method for compensating for humidity in a lean burn engine having a desired fuel/air ratio, comprising the steps of:
   determining the specific humidity of the air supplied to the engine; and
   calculating an adjusted desired fuel/air ratio based on the specific humidity.

5. The method of claim 4 wherein the step of determining the specific humidity is performed by measuring the temperature of the air supplied to the engine, measuring the relative humidity of the air supplied to the engine, and calculating the specific humidity based on the temperature and the relative humidity.

6. The method of claim 4, wherein the fuel/air ratio is expressed in terms of a lean limit equivalence ratio.

7. The method of claim 4, wherein said calculating step is performed by accessing a table of stored humidity compensation data.

8. A humidity compensation system for a lean burn combustion engine having a spark timing condition, the control system comprising:
   a temperature sensor for measuring the temperature of the air supplied to the engine;
   a humidity sensor for determining the relative humidity of the air supplied to the engine; and
   a processor operable to:
      receive a signal associated with the temperature from the temperature sensor;
      receive a signal associated with the relative humidity from the humidity sensor;
      calculate the specific humidity of the air supplied to the engine based on the signal received from the temperature sensor and the signal received from the humidity sensor;
      calculate a compensated spark timing based on the specific humidity of the air supplied to the engine.

9. The humidity compensation system of claim 8 further comprising a memory for storing spark timing humidity compensation data and wherein said processor is further operable to access the memory for its calculations.

10. A humidity compensation system for a lean burn combustion engine having a boost pressure for a turbocharger, the control system comprising:
   a temperature sensor for measuring the temperature of the air supplied to the engine;
   a humidity sensor for determining the relative humidity of the air supplied to the engine; and
   a processor operable to:
      receive a signal associated with the temperature from the temperature sensor;
      receive a signal associated with the relative humidity from the humidity sensor;
      calculate the specific humidity of the air supplied to the engine based on the signal received from the temperature sensor and the signal received from the humidity sensor;
      calculate a compensated boost pressure based on the specific humidity of the air supplied to the engine.

11. The humidity compensation system of claim 10 further comprising a memory for storing boost pressure humidity compensation data and wherein said processor is further operable to access the memory for its calculations.

12. A humidity compensation system for a lean burn combustion engine having a combustion chamber, the control system comprising:
   a temperature sensor for measuring the temperature of the air supplied to the engine;
   a humidity sensor for determining the relative humidity of the air supplied to the engine;
   an exhaust gas oxygen sensor for measuring the level of oxygen concentration in exhaust gas discharged from the combustion chamber; and
   a processor coupled to the memory, the processor operable to:

receive a signal associated with the temperature from the temperature sensor;

receive a signal associated with the relative humidity from the humidity sensor;

receive a signal associated with the level of oxygen concentration from the exhaust gas sensor;

calculate the specific humidity of the air supplied to the engine based on the signal received from the temperature sensor and the signal received from the humidity sensor;

calculate a compensated exhaust gas oxygen measurement based on the specific humidity of the air supplied to the engine.

13. The humidity compensation system of claim 12 further comprising a memory for storing exhaust gas oxygen humidity compensation data and wherein said processor is further operable to access the memory for its calculations.

14. A method for compensating for humidity in a lean burn engine having a spark timing engine operating condition, comprising the steps of:

determining the specific humidity of the air supplied to the engine; and calculating an adjusted spark timing based on the specific humidity.

15. The method of claim 14, wherein said determining step is performed by obtaining a relative humidity measurement and a temperature measurement.

16. The method of claim 14, wherein said calculating step is performed by accessing a table of stored humidity compensation data.

17. A method for compensating for humidity in a lean burn engine having a boost pressure operating condition for a turbocharger, comprising the steps of:

determining the specific humidity of the air supplied to the engine; and calculating an adjusted boost pressure based on the specific humidity.

18. The method of claim 17, wherein said determining step is performed by obtaining a relative humidity measurement and a temperature measurement.

19. The method of claim 17, wherein said calculating step is performed by accessing a table of stored humidity compensation data.

20. A method for compensating for humidity in a lean burn engine having an exhaust gas sensor, comprising the steps of:

determining the specific humidity of the air supplied to the engine; and calculating an adjusted exhaust gas sensor output based on the specific humidity.

21. The method of claim 20, wherein said determining step is performed by obtaining a relative humidity measurement and a temperature measurement.

22. The method of claim 20, wherein said calculating step is performed by accessing a table of stored humidity compensation data.

* * * * *